Nov. 4, 1958 H. E. TEMPLE 2,858,776
LOAF SPLITTER
Filed April 12, 1955 4 Sheets-Sheet 1

INVENTOR.
Hiram E. Temple
BY
Otto Moeller
Attorney

Nov. 4, 1958

H. E. TEMPLE 2,858,776

LOAF SPLITTER

Filed April 12, 1955

INVENTOR.
Hiram E. Temple
BY
Otto Moeller
Attorney

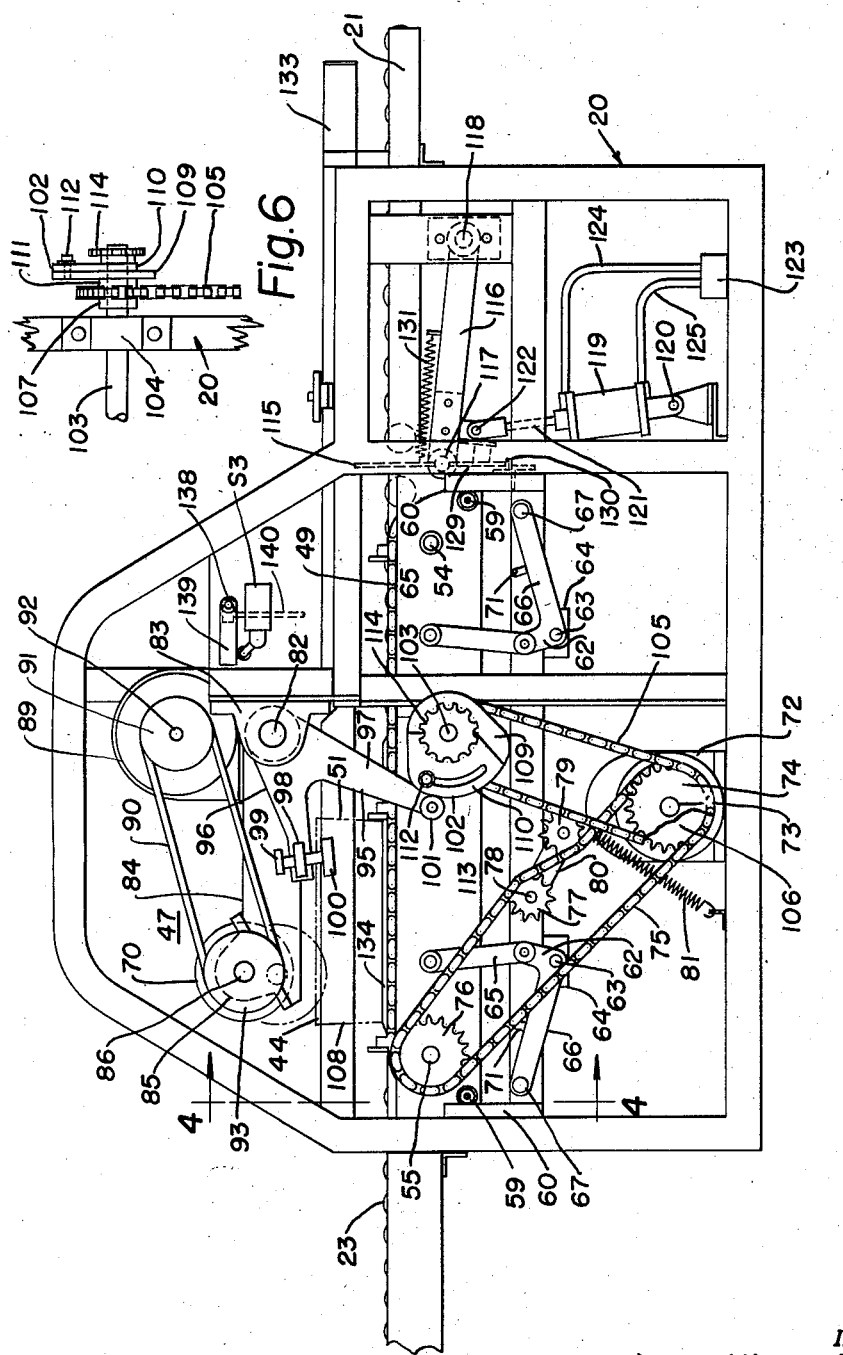

Nov. 4, 1958  H. E. TEMPLE  2,858,776
LOAF SPLITTER
Filed April 12, 1955  4 Sheets-Sheet 4
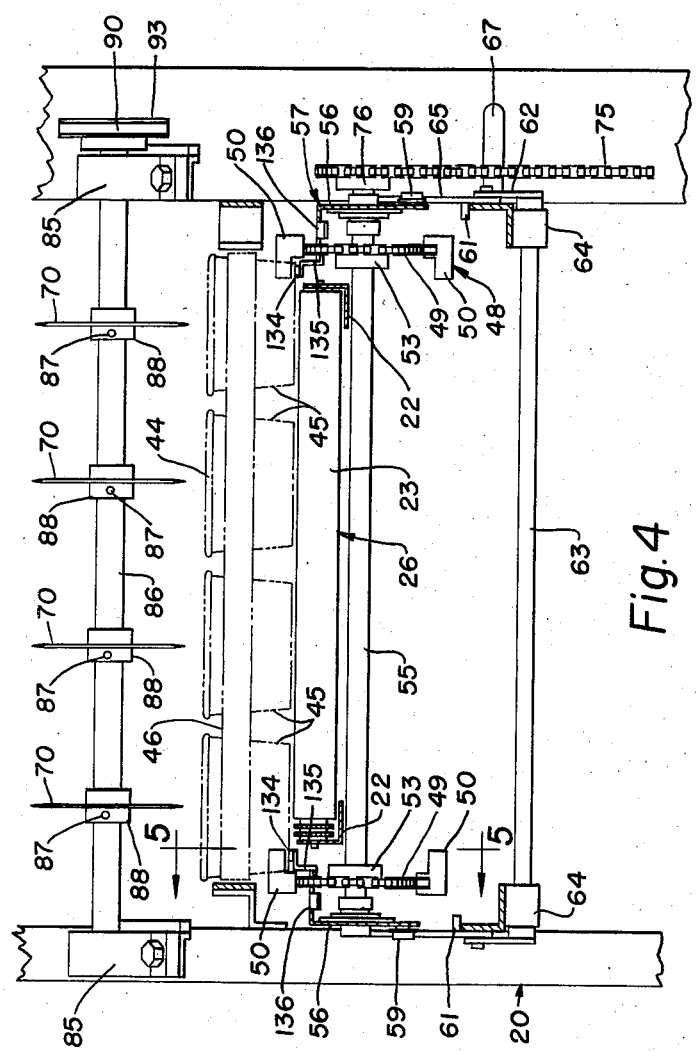
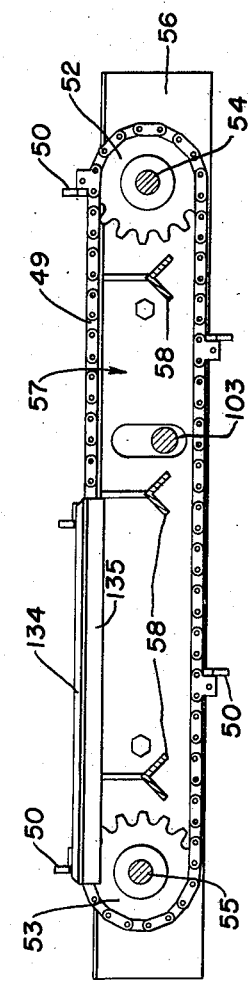
INVENTOR.
Hiram E. Temple
BY
Otto Maelter
Attorney United States Patent Office 2,858,776
Patented Nov. 4, 1958

2,858,776

LOAF SPLITTER

Hiram E. Temple, York, Pa., assignor, by mesne assignments, to Capitol Products Corporation, Mechanicsburg, Pa., a corporation of Pennsylvania Application April 12, 1955, Serial No. 500,791

6 Claims. (Cl. 107—22)

This invention relates to novel apparatus for splitting the tops of dough loaves while in the pans in which they have been proofed and prior to baking.

It has previously been the practice to manually feed the straps of pans to the conveyor of a loaf splitting machine at appropriate intervals to insure proper orientation of the pans, during their conveyance, with the vertically reciprocating loaf splitting blades.

An important object of the invention is to provide a loaf splitting apparatus wherein the pans are automatically delivered to the loaf splitter conveyor in proper sequential order from an infeed conveyor for proper orientation of the pans with respect to the vertically reciprocating loaf splitting blades. This is of particular importance in present day mass production bakeries where the pans are automatically unloaded from proofing racks onto a feeding conveyor that transports the pans of proofed dough to the oven. In such installations, the present loaf splitting apparatus may be interposed in the feeding conveyor, without any manual intervention being necessary to deliver the pans to the loaf splitting conveyor in proper timed sequence.

Another important object of the invention is to provide in a loaf splitting apparatus adapted to be interposed in a conveyor line transporting pans of dough loaves, simple and efficient means for rendering the apparatus inoperative to split the tops of the dough loaves while permitting the pans of dough loaves to pass freely through the apparatus when it is desired to run a batch of bread of the non-split type. Thus in a bakery employing a conveying system for transporting the pans of dough loaves to an oven, the change-over from split top bread to non-split top bread can be made almost instantaneously and without the provision of a by-pass conveyor around the loaf splitting apparatus.

Another object of the invention is to provide means in a loaf splitting apparatus of the type described for rendering the loaf splitting mechanism inoperative when a pan, delivered by the feeding conveyor to the conveyor that orients the pan with the cutting discs of the loaf splitter, is accidentally dislocated.

The invention also comprises novel details of construction and novel combinations and arrangements of parts, which will more fully appear in the course of the following description which, considered in connection with the accompanying drawings, sets forth the preferred embodiment of the invention.

In the drawings,

Figure 3 is a side elevational view of the side of the apparatus opposite that shown in Figure 2;

Figure 4 is a sectional view of the apparatus taken on the line 4—4 of Figure 3;

Figure 5 is a sectional view of the apparatus taken on the line 5—5 of Figure 4; and Figure 6 is a fragmentary detail view of the apparatus showing the cam and driving arrangement therefore; for controlling the extension and retraction of the cutting discs.

Figure 1:
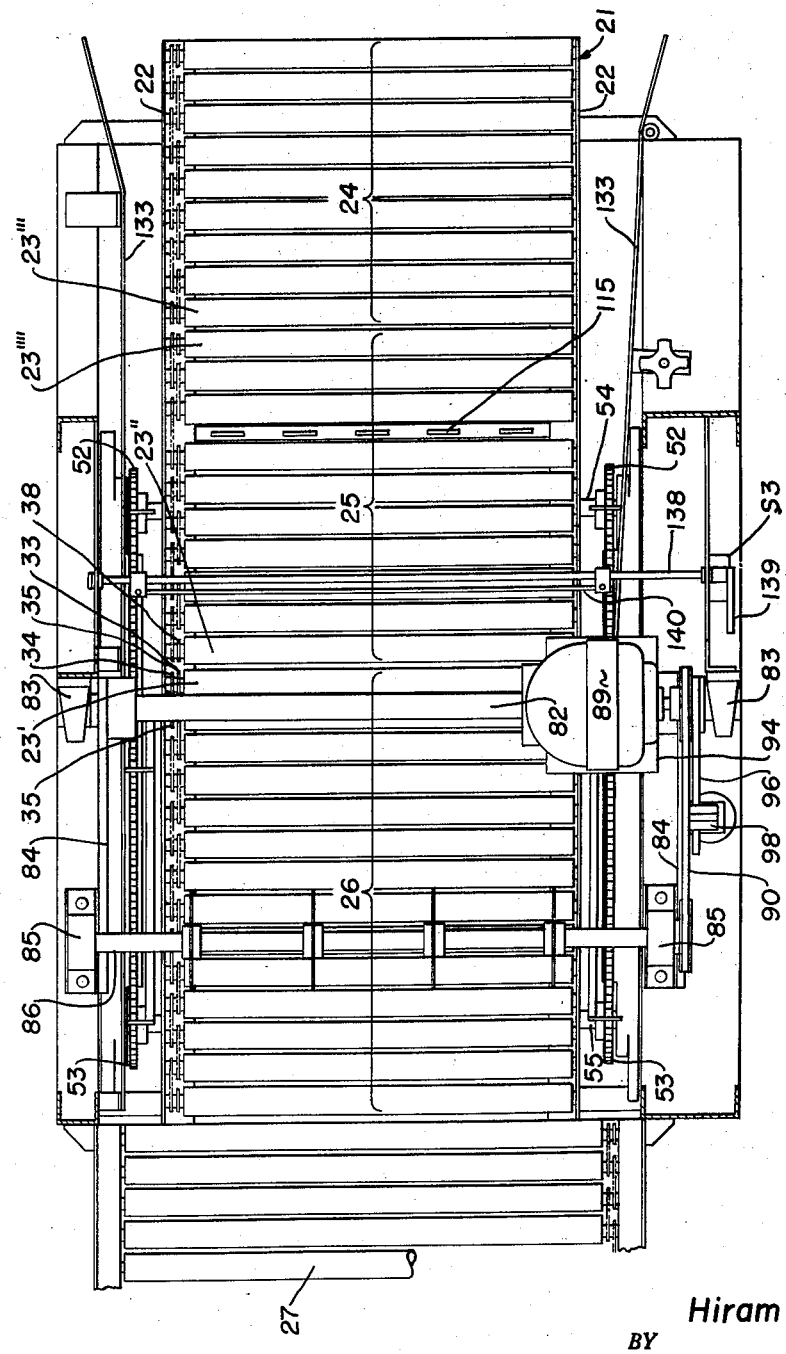
Figure 1 is a plan view of the invention.

Referring to the drawings, the loaf splitter apparatus includes a supporting structure in the form of a box like skeleton frame 20. A horizontal powered roll conveyor, designated as a whole by the reference numeral 21, extends longitudinally through the frame 20. As best shown in Figure 1, the powered roll conveyor 21 comprises two parallel transversely spaced frame members 22 secured in suitable manner to and at opposite sides of the frame 20. The extreme left end sections of the frame members 22, as viewed in Figure 1, are preferably though not necessarily spaced somewhat further apart than the rest of the sections thereof. Rotatably mounted in the frame members 22 are a plurality of closely spaced conveyor rolls 23.

Viewed from the right to left in Figure 1, a plurality of successive rolls 23 are arranged to form a pan infeed conveyor 24 operated at one speed, for example, 59 feet per minute; a next succession of rolls 23 are arranged to form a pan spacer conveyor 25 operating at a higher speed, for example, 81 feet per minute; a next succession of rolls 23 are arranged to form a pan compacting conveyor 26 operating at the same speed as the pan infeed conveyor, in the present example 59 feet per minute; and a next succession of rolls 23 are arranged to form a pan take-away conveyor 27 operating at any desired speed, at least sufficient to take the pan sets away as fast as delivered thereto. The reason for the different operating speeds of the conveyors 24, 25 and 26 will become apparent as the description proceeds.

Figure 2:
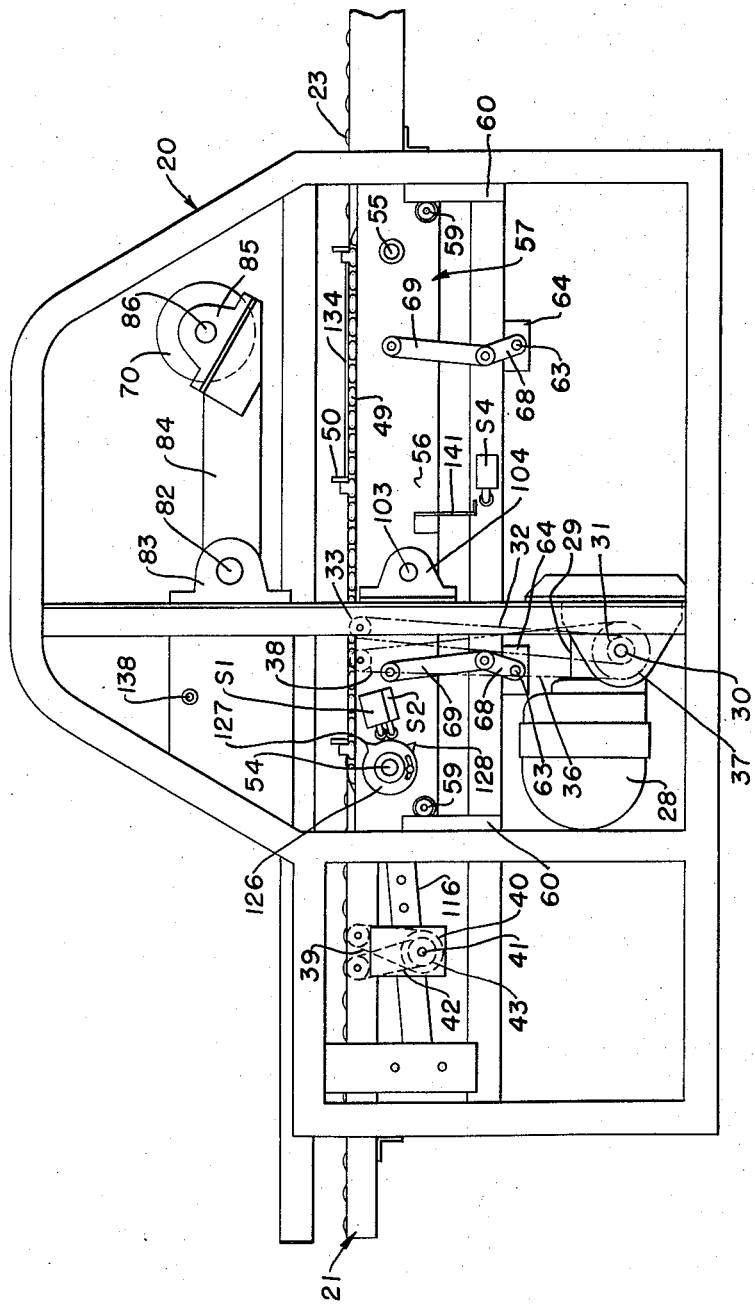
Figure 2 is a side elevational view of one side of the apparatus shown in Figure 1.

Turning now to the operating means for the conveyors 24, 25, 26 and 27, power is supplied by the motor 28 for operating the conveyors 24, 25 and 26, while pan take-away conveyor 27 is preferably operated from a separate motor, not shown. As shown in Figure 2, motor 28 is mounted in the frame 20 below the level of the roll conveyor 21 and through reduction gearing 29 rotates reduction gearing output shaft 30.

Carried by the shaft 30 is a sprocket 31, around which is trained a chain 32, this chain also being trained around a sprocket 33 mounted on one end of the terminal roll 23' of the compacting conveyor 26 for rotating this terminal roll. Rotation of terminal roll 23' is transmitted to the next succeeding roll 23 of conveyor 26 by a chain 34 trained around a second sprocket 35 mounted on the end of the terminal roll 23' and a similar sprocket 35 mounted on the end of the next succeeding roll 23 of conveyor 26. Each succeeding roll 23 is driven by its preceeding roll 23 by a similar chain 34 trained around sprockets mounted respectively on the end of a succeeding and a preceding roll 23.

In similar manner, the rolls 23 of spacer conveyor 25 are operated by means of a chain 36 trained around a second sprocket 37 on the shaft 30 and a sprocket 38 mounted on one end of the terminal roll 23" of spacer conveyor 25. The sprocket 37 is larger than the sprocket 31, as shown in Figure 2, so that spacer conveyor 25 operates faster than compacting conveyor 26, and as previously stated the former may have a speed of 81 feet per minute and the latter a speed of 59 feet per minute. These speeds are set forth for purpose of illustration and may be altered, of course, in accordance with desired operating conditions.

Referring to Figure 1 and more particularly to Figure 2, it will be noted that the sprockets of the adjacent terminal rolls 23''' and 23'''' of the infeed conveyor 24 and the spacer conveyor 25, respectively, are not directly connected by a chain entrained thereover, as are the other sprockets of these conveyors. Instead, the sprocket of terminal roll 23'''' has a chain 39 trained around it, which chain is also trained around a sprocket 40 mounted on a rotatable shaft 41 disposed below the level of the conveyors and suitably supported by the frame 20, whereby shaft 41 is driven from motor 28 through intermediacy of spacer conveyor 25. Another chain 42 is trained around the sprocket of terminal roll 23''' and a second sprocket 43 also mounted on shaft 41. The sprocket 40 is larger than sprocket 43, so that infeed conveyor 24 will travel slower than spacer conveyor 25, preferably the same speed as compacting conveyor 26, or 59 feet per minute in the specific example selected.

The powered roll conveyor 21, comprising the conveyors 24, 25, 26 and 27, conveys successive pan sets 44 to, through and from the loaf splitting apparatus. The pan sets 44 comprise a plurality of laterally spaced individual pans 45, in the present instance four as shown in Figure 4, secured in an integrated unit by a strap 46 secured to and embracing the individual pans 45. The pan sets of dough are conveyed under the cutter assembly of the apparatus, indicated as a whole by the reference numeral 47, and hereinafter described in detail. The cutter assembly 47, as later explained, makes a longitudinal incision in the top of the proofed loaf to produce after baking what is known as a split top loaf of bread. If the baker desires to run a batch of bread without the split top, by simple and convenient manipulation the cutter assembly 47 can be rendered inoperative so that the pan sets of dough are conveyed through the apparatus by the powered roll conveyor 21 in their transit, for example, from an automatic rack unloader to the oven loader, without splitting the loaf tops. When the baker desires to run a batch of split top bread, by the same simple manipulation the cutter assembly 47 can be rendered operative. In this latter case, a sweep conveyor 48 supplements the powered roll conveyor 21 in transporting the pan sets 44 through the apparatus.

The sweep conveyor 48 comprises a pair of transversely spaced longitudinally extending endless chains 49 disposed laterally beyond the sides of the frames 22 that support the rolls 23 of the roll conveyor 26, as best shown in Figure 4. Attached to each of the chains 49 are a plurality of equidistantly spaced inwardly extending sweep members 50 adapted when traveling along the upper run of the sweep conveyor 48 to engage the rear wall 51 of a pan set 44, as best seen in Figure 3. Each of the chains 49 is trained at one end around a sprocket 52 and at its other end around a sprocket 53. The sprockets 52 are fixed on a transversely extending shaft 54 disposed below and between the receiving and discharge ends of the pan spacer roll conveyor 25. The sprockets 53 are fixed on a transversely extending shaft 55 disposed below and near the discharge end of pan compacting roll conveyor 26. Thus the sweep conveyor 48 extends almost the full length of the roll conveyor 26 and overlaps a portion of the roll conveyor 25.

The shafts 54 and 55 are rotatably mounted in the side plates 56 of a carriage 57, the side plates 56 extending longitudinally along opposite sides of the apparatus and being tied together by a plurality of transversely extending tie bars 58. As best shown in Figures 2 and 4, the respective ends of the side plates 56 are provided with flanged rollers 59 adapted to ride along vertically extending stabilizing rails 60 secured to upright frame members of the frame 20, whereby vertical movement of the carriage 57 is provided for while longitudinal and lateral movement thereof is prevented. Pads 61 secured to the frame 20 beneath respective ends of the side plates 56 limit downward movement of the carriage 57 and provide a support therefor in its lowered or retracted position. The pads 61 are so disposed that in the retracted position of the carriage 57, the sweep members 50 along the upper run of the chains 49 of the sweep conveyor 48 are below the level of the conveying surface of the roll conveyors 25 and 26, whereby to render the sweep conveyor ineffective for conveying pans under the cutter assembly 47 and whereby conveyance of the pans is effected solely by the roll conveyors 25 and 26.

The carriage 57 is raised or lowered to extended or retracted position through toggles adjacent opposite ends and at each side of the carriage. Referring particularly to Figure 3, the toggles on the one side of the carriage 57, each comprises an arm 62 fixed to the end of a respective shaft 63. As will be seen by referring to Figures 2, 3 and 4, the shafts 63 extend transversely and are rotatably mounted adjacent their opposite ends in bearing blocks 64, the bearing blocks 64 being rigidly secured to opposite side frame members of frame 20. The toggles, referring again to Figure 3, each also includes a link 65 pivotally connected at one end to the arm 62 and pivotally connected at the opposite end to the side frame 56 of the carriage 57. The arm 62 constitutes one arm of a bellcrank lever, the other arm of which, indicated at 66, is provided at its free end with a laterally projecting handle 67 by means of which the operator may raise or lower the carriage 57.

The toggles on the opposite side of the carriage 57, as shown in Figure 2, each comprises an arm 68 rigidly secured on the end of a respective shaft 63, and a link 69 pivotally connected at one end to the arm 68 and pivotally connected at the opposite end to the side frame 56 of the carriage 57.

In the drawings the carriage 57 is shown in its raised or extended position, in which position the sweep members 50 along the upper run of the chains 49 of the sweep conveyor 48 are slightly above the level of the conveying surface of the roll conveyors 25 and 26 so that the sweep members 50 of the sweep conveyor 48, which sweep conveyor preferably has a greater speed than the roll conveyor 26, will engage the rear wall 51 of the pan sets 44 during passage of the pan sets under the cutting discs 70 of the cutter assembly 47. In the raised position of the carriage 57, referring to Figure 3, the toggles are shown slightly broken, but further breaking of the toggles is prevented by lugs 71 rigidly secured to the frame 20 which engage the arms 66, thereby retaining the carriage in its raised or extended position.

To move the carriage 57 to its lowered or retracted position, the operator grasps the handles 67 and pushes down on them so that the toggles will move first to a straight position and then break in the opposite direction from that shown in Figure 3, whereby the carriage 57 is permitted to descend until stopped by engagement with the pads 61. Conversely, if the operator desires to raise the carriage 57 from its retracted to its extended position, he pulls upwardly on handles 67 so that the toggles will move first to a straight position and then break in the opposite direction to the position shown in Figure 3, further breaking being prevented, as before stated, by the lugs 71. The toggles on the opposite side will break and straighten in similar manner, since the arms 68 are rigidly secured to the shafts 63, which shafts are turned through the means above described when the operator moves the handles 67 upwardly or downwardly.

Referring particularly to Figure 3, the operating means for the sweep conveyor 48 includes a motor 72 mounted on the base of the frame 20. Mounted on the motor shaft 73 is a sprocket 74 around which is trained a chain 75, the chain 75 being also trained around a sprocket 76 mounted on an extension of the sweep conveyor shaft 55. The chain 75 is also trained over an idler sprocket 77 rotatably mounted on a stub shaft 78 carried by the frame 20, and under an idler sprocket 79 rotatably supported on the free end of an arm 80, which arm 80 is pivotally mounted at its other end on the stub shaft 78. A spring 81, attached at one end to the base of the frame 20 and at its other end to the free end of the arm 80 biases the idler sprocket 79 against the chain 75 to take up the slack in the chain 75 when the carriage 57 is moved to its lowered or retracted position.

Turning now to the cutter assembly 47 and referring particularly to Figures 1 and 3, a transversely extending shaft 82 is spaced above the sweep conveyor 48 nearer its receiving than its discharge end, and is rotatably mounted at its ends in bearings 83 supported by the frame 20. Rigidly mounted at the ends of the shaft 82 inwardly of the bearings 83 are a pair of transversely spaced longitudinally extending arms 84 directed toward the discharge end of the apparatus. At their free ends, the arms 84 carry bearings 85 in which is rotatably mounted a transversely extending shaft 86. A plurality of knife edged cutting discs 70, one for each pan 45 of a pan set 44, are mounted on the shaft 86. The cutting discs 70 are adjustable along the shaft 86 to locate them centrally between the sides of respective pans 45 of a pan set 44, and are secured in adjusted position to the shaft 86 by means of set screws 87 extending through the hubs 88 of the cutting discs 70.

The above described mounting arrangement of the cutting discs on the free ends of the arms 84 it will be seen, permits of upward and downward movement of the cutting discs in an arc about the axis of rotatably mounted shaft 82. The means for effecting and controlling upward and downward movement of the cutting discs, and the reasons therefor, will be described further on in this description. The cutting discs are rapidly rotated by a motor 89 through a V belt 90 trained around a sheave 91 mounted on motor shaft 92 and a sheave 93 mounted on an extension of the shaft 86. The motor 89 is mounted on a support 94 that is rigidly secured to the rotatable shaft 82, so that the motor 89 will rotate as a unit with the cutting disc supporting arms 84, and maintain the sheaves 91 and 93 in proper driving relation.

The means for intermittently raising and lowering the cutting discs 70 will now be described. Referring particularly to Figure 3, rotatably mounted on the shaft 82 between the bearing 83 and arm 84 is a rocker member 95 having upper and lower diverging arms 96 and 97. The free end of the upper arm 96 is provided with a laterally projecting lug 98 and the arm 84 is provided with a laterally projecting lug 99 overlying the lug 98. An adjusting screw 100 is threaded through the lug 98 and abuts the under side of lug 99 whereby arm 84 and consequently the cutting discs 70 are supported by the rocker arm 96. The lower rocker arm 97 carries on its free end a cam follower 101.

The cam follower 101 engages cam means 102 for intermittent raising and lowering of the cutting discs 70. The cam means 102 is mounted on a transversely extending shaft 103 for rotation therewith and the shaft 103 is rotatably mounted in bearings 104 supported by the frame 20. A chain 105 is trained around a sprocket 106 on motor shaft 73 and a sprocket 107 on the cam shaft 103 whereby to effect rotation of the cam means 102. The cam means 102 and the sweep conveyor 48 operate in timed relation since they are both actuated from the motor shaft 73 through the means previously described, so that by proper selection of cam means and sprockets, raising and lowering of the cutting discs may be controlled relative to the position of the pan sets as they are conveyed by the sweep conveyor whereby the cutting discs descend into the pans just rearward of the front wall 108 of a pan set and ascend from the pans just forward of the rear wall 51 of a pan set.

The cam means 102 includes an inner and outer cam disc 109 and 110, as best shown in Figures 3 and 6, the inner cam disc 109 being secured in suitable manner through its hub 111 to the cam shaft 103. The cam means 102 rotates in counterclockwise direction, as viewed in Figure 3, and the leading edge of the high portion of cam disc 109 upon engagement with cam follower 101 effects raising of the cutting discs from the pans. The outer cam disc 110 is rotatably adjustable with respect to inner cam disc 109 to lengthen or shorten the high part of the cam means 102 by means of lock screw 112 extending through radial slot 113 of outer cam disc 110 and threaded in inner cam disc 109. The cam means 102 is locked in place by a hand knob 114. By lengthening or shortening the high part of the cam means 102 by the adjusting means above described, the cutting blades can be made to descend later or sooner depending on the length of the pans. In order to adjust the depth of penetration of the cutting discs 70 in the pans and thereby the depth of the split in the loaves, the adjusting screw 100 can be threaded in or out to raise or lower the arm 84 relative to the rocker member 95, thereby correspondingly raising or lowering the cutting discs 70.

Delivery of pan sets 44 to the sweep conveyor 48 is controlled by a gate 115 which is operated, as hereinafter described, in time relation with sweep conveyor 48 so that they are in proper position to be pushed under the cutter assembly 47 by the sweep members 50. The gate 115 is disposed between two adjacent rolls 23 of the pan spacer conveyor 25 rearward of the sweep conveyor 48, and is movable between an extended position, as shown in Figure 3, wherein it is adapted to intercept a pan set 44, and a retracted position wherein it is out of the path of a pan set to permit passage of such pan set along the conveyor 25.

The gate 115 is mounted for movement between its extended and retracted positions by arm means 116 pivotally connected to the gate at 117 and carried by a shaft 118 which is rotatably supported by the frame 20. The gate 115 is positively actuated to both its extended and retracted position by a valve controlled air cylinder 119, pivotally mounted at 120, and having its piston rod 121 pivotally connected at 122 to the arm means 116. The valve for controlling operation of air cylinder 119, shown but not illustrated in detail at 123 in Figure 3, is of well known two-position reversing solenoid valve type having separate energizing circuits. This valve serves, in one position, to connect the upper end of cylinder 119 through line 124 to a suitable source of air pressure, not shown, and to connect the lower end of cylinder 119 through line 125 to exhaust, for retracting the gate 115; and serves, in its other position, to connect the lower end of cylinder 119 through line 125 with the said source of air pressure, not shown, and to connect the upper end of cylinder 119 through line 124 to exhaust, for extending the gate 115. Energization of the solenoid means, not shown, of the solenoid valve 123, to move the valve element to one position or the other is controlled by the microswitches S–1 and S–2 arranged in separate energizing circuits with the solenoid means, operation of which switches will now be described.

Mounted on one end of the sweep conveyor shaft 54, as best shown in Figure 2, for rotation therewith is a cam means 126, comprising outer cam 127 and inner cam 128 adjustably secured together to vary the circumferential spacing between the cams. The cam means 126, as viewed in Figure 2, rotates in clockwise direction, and when outer cam 127 engages microswitch S–1, solenoid operated valve 123 is actuated as above described to admit air through line 124 to the top of air cylinder 119 to retract the gate 115 and allow a pan set to pass. The gate 115 will remain in retracted position until, upon continued rotation of cam means 126, inner cam 128 engages microswitch S–2 whereby to reverse the valve 123 to admit air to the bottom of air cylinder 119 through line 125 to again extend the gate 115 to pan intercepting position. During that same interval, the leftmost of the sweep members 50 along the upper run of sweep conveyor 48, as viewed in Figure 2, has advanced sufficiently to provide space for the oncoming pan set and the next pair of sweep members is about to emerge behind the pan set for advancing it beneath the cutter assembly 47.

As previously stated, the roll conveyor 25 operates faster than the roll conveyor 24, thereby moving the pan set past the retracted gate 115 by the roll conveyor 25 faster than the next pan set 44 is being conveyed by the roll conveyor 24, and providing sufficient spacing between the pan sets, so that the gate 115 upon being extended is assured of entering between the two pan sets without fouling against the bottom of either. By adjusting the spacing between the cams 127 and 128, the interval of retraction of the gate 115 may be varied for different lengths of pans.

As above pointed out, each time the cam 127 engages switch S–1, valve 123 is actuated to cause air to be admitted to the top of air cylinder 119 to retract the gate 115. However, the gate 115 will not retract unless at that time there is a pan set in engagement with the gate since the latch element 129 of the gate 115 will engage the keeper element 130. If at such time a pan set is in engagement with the gate 115, the gate rotates against the action of spring 131 to move the latch element 129 off the keeper element 130 wherein it engages the stop 132, permitting retraction of the gate 115. Thus, the gate 115 passes a pan set only at the beginning of each operating cycle of the cam 127, i. e., only when the cam 127 engages switch S–1. This insures that the pan sets are always discharged in perfect synchronism with the passage of the sweep members 50 of the sweep conveyor 48.

In operation, pan sets of dough are advanced by roll conveyor 24 to roll conveyor 25 between guides 133 to properly align the pans of the pan sets with the cutting discs 70. At the proper time in the operating cycle, as previously described, the gate 115 is retracted to permit a pan set to be advanced by the faster moving roll conveyor 25 to separate the advancing pan set from the next succeeding pan set, as and for the purpose previously described. From the fast roll conveyor 25, the pan set is delivered onto the slower roll conveyor 26 where it rides up off the roll conveyor onto the stationary longitudinally extending rails 134, best shown in Figures 4 and 5. The rails 134 are supported on brackets 135 rigidly secured to flanges 136 formed with and extending inwardly of the carriage side plates 56 through the loops of the sweep conveyor chains 49. Since the rails 134 are above the level of the roll conveyor 26, it will be seen that the pan sets are positively pushed under the cutting discs 70 by the sweep members 50 of the sweep conveyor 48. As previously explained the cutting discs 70 descend to slit the dough loaves in the pans.

Means is provided for stopping the sweep conveyor motor 72 should a pan set accidentally ride up on a sweep member 50. This means includes an arm 139 carried on a shaft 138 rotatably mounted in the frame 20. The weight of this arm 139 normally holds microswitch S–3 closed, the switch S–3 being suitably connected with sweep conveyor motor 72 and under such normal conditions permitting motor 72 to run. A second arm 140 is secured to shaft 138 and depends therefrom normally permitting pan sets to pass thereunder but arranged to be engaged by a pan set that happened to ride up on one of the sweep members 50. When such a dislocated pan set engages the arm 140, it causes arm 139 to pivot upwardly to permit switch S–3 to open and stop sweep conveyor motor 72, thereby halting further advance of the pan set and preventing fouling of the cutting discs 70 by the dislocated pan set.

When during the day's run it is desired to produce batches of bread without the split top, the operator stops sweep conveyor motor 72 in position so that the cam means 102 retains the cutting discs 70 in raised or retracted position. Carriage 57 is lowered through the means previously described by pushing downwardly on handles 67, whereby the sweep members 50 are lowered below the level of the roll conveyor 21. On descent of the carriage 57, an arm 141 carried thereby engages a microswitch S–4 mounted on the frame 20, as shown in Fig. 2. The switch S–4 is in an electrical circuit with the solenoid operated air valve 123 and functions when actuated by arm 141 to move the valve element of the solenoid operated valve 123 to a position to connect the upper end of cylinder 119 through line 124 with the source of air pressure, not shown, and to connect the lower end of cylinder 119 through line 125 to exhaust, if at that time the control means including microswitch S–1, previously described, has not effected such movement of the valve element, whereby the gate 115 will move to retracted position when the operator releases the gate latch element 129 from the keeper element 130. The pan sets of dough are now free to run through the apparatus on the powered roll conveyors 21 until such time as the operator desires to run a batch of split top bread.

I claim:

1. In an apparatus for splitting the top portions of dough loaves, the combination of: supporting structure providing a loaf splitting station; a powered roll conveyor carried by said supporting structure for transporting pans of dough through said apparatus; an endless chain conveyor along that portion of said roll conveyor in said loaf splitting station having sweep means to positively engage and propel pans of dough through said loaf splitting station; rotatable cutting discs in said loaf splitting station movable between an extended position wherein they are in position for cutting the top portions of the loaves in said pans and a retracted position wherein they are out of cutting position; means for selectively moving said endless chain conveyor between an extended position wherein said sweep means on the top run thereof is above the conveying level of said powered roll conveyor to convey pans through said loaf splitting station, and to a retracted position wherein said sweep means is below the conveying level of said powered roll conveyor whereby pans of dough are conveyed through said apparatus by said powered roll conveyor when said rotatable cutting discs and said endless conveyor are rendered inoperative.

2. An apparatus as defined in claim 1 including means for moving said cutting discs between extended and retracted positions in timed relation with movement of said endless chain conveyor.

3. An apparatus as defined in claim 2, wherein said powered roll conveyor includes escapement means adapted to pass one pan at a time to said endless chain conveyor and means for operating said escapement means in timed relation with said endless chain conveyor.

4. An apparatus as defined in claim 2 including means controlling transfer of pans from said powered roll conveyor to said endless chain conveyor comprising a gate having a raised pan retaining position and a lowered pan releasing position, actuating means for positively raising and lowering said gate, and control means responsive to a predetermined travel of said endless chain conveyor for energizing said actuating means to lower said gate and a predetermined further travel for said endless chain conveyor for energizing said actuating means to raise said gate.

5. In an apparatus for splitting the top portions of dough loaves, the combination of: supporting structure providing a loaf splitting station; a powered roll conveyor carried by said supporting structure for transporting pans of dough through said apparatus; a carriage beneath said powered roll conveyor movably carried by said supporting structure; means guiding and constraining movement of said carriage in vertical direction; an endless chain conveyor carried by said carriage having sweep members adapted to positively engage and propel pans of dough; longitudinally extending laterally spaced rails carried by said carriage along a portion of said endless chain conveyor in said loaf splitting station; rotatable cutting discs in said loaf splitting station movable between an extended position wherein they are in position for cutting the top portions of the loaves in said pans and a retracted position wherein they are out of cutting position; means for moving said carriage between an extended position wherein said rails and the sweep means on the top run of said endless chain conveyor are above the conveying level of said powered roll conveyor for positively propelling pans along said rails in said loaf splitting station, and a retracted position wherein said rails and sweep means are below the conveying level of said powered roll conveyor whereby pans are adapted to be transported through said apparatus by said powered roll conveyor when said rotatable discs and said endless conveyor are rendered inoperative.

6. In an apparatus for splitting the top portions of dough loaves, the combination of: supporting structure providing a loaf splitting station; a powered roll conveyor carried by said supporting structure for transporting pans of dough through said apparatus; an endless chain conveyor along the portion of said roll conveyor in said loaf splitting station having sweep means to positively engage and propel pans of dough through said loaf splitting station; rotatable cutting discs in said loaf splitting station movable between an extended position wherein they are in position for cutting the top portions of the loaves in said pans and a retracted position wherein they are out of cutting position; means for selectively moving said endless chain conveyor between an extended position wherein said sweep means on the top run thereof is above the conveying level of said powered roll conveyor to convey pans through said loaf splitting station, and to a retracted position wherein said sweep means is below the conveying level of said powered roll conveyor; actuating means for moving said cutting discs between extended and retracted positions and for operating said endless chain conveyor to convey pans; said powered roll conveyor including escapement means adapted to release one pan at a time to said endless chain conveyor, and means responsive to movement of said chain conveyor into retracted position for rendering said escapement means ineffectual for stopping pans on said powered roll conveyor, whereby pans of dough are adapted to be conveyed through said apparatus by said powered roll conveyor.

References Cited in the file of this patent

UNITED STATES PATENTS

| | | |
|---|---|---|
| 1,531,000 | Goodwin | Mar. 24, 1925 |
| 1,680,779 | Freeman | Aug. 14, 1928 |
| 2,160,387 | Lyon | May 30, 1939 |
| 2,576,369 | Sticelber | Nov. 27, 1951 |